April 22, 1958  H. R. MONTBRIAND ET AL  2,831,609
LIQUID DISPENSING APPARATUS
Filed Jan. 9, 1957  4 Sheets-Sheet 1

INVENTORS
HAROLD R. MONTBRIAND
EARL L. MONTPETIT
BY Mark W. Gehan
ATTORNEY

INVENTORS
HAROLD R. MONTBRIAND
EARL L. MONTPETIT
BY Mark W. Gehan
ATTORNEY

April 22, 1958    H. R. MONTBRIAND ET AL    2,831,609
LIQUID DISPENSING APPARATUS
Filed Jan. 9, 1957                           4 Sheets-Sheet 3
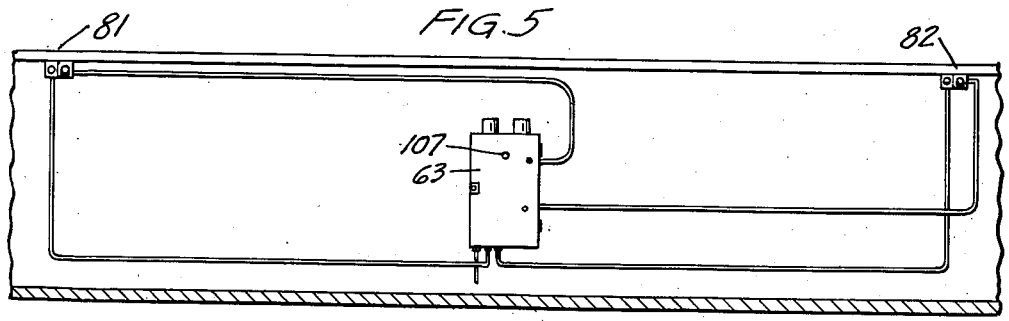
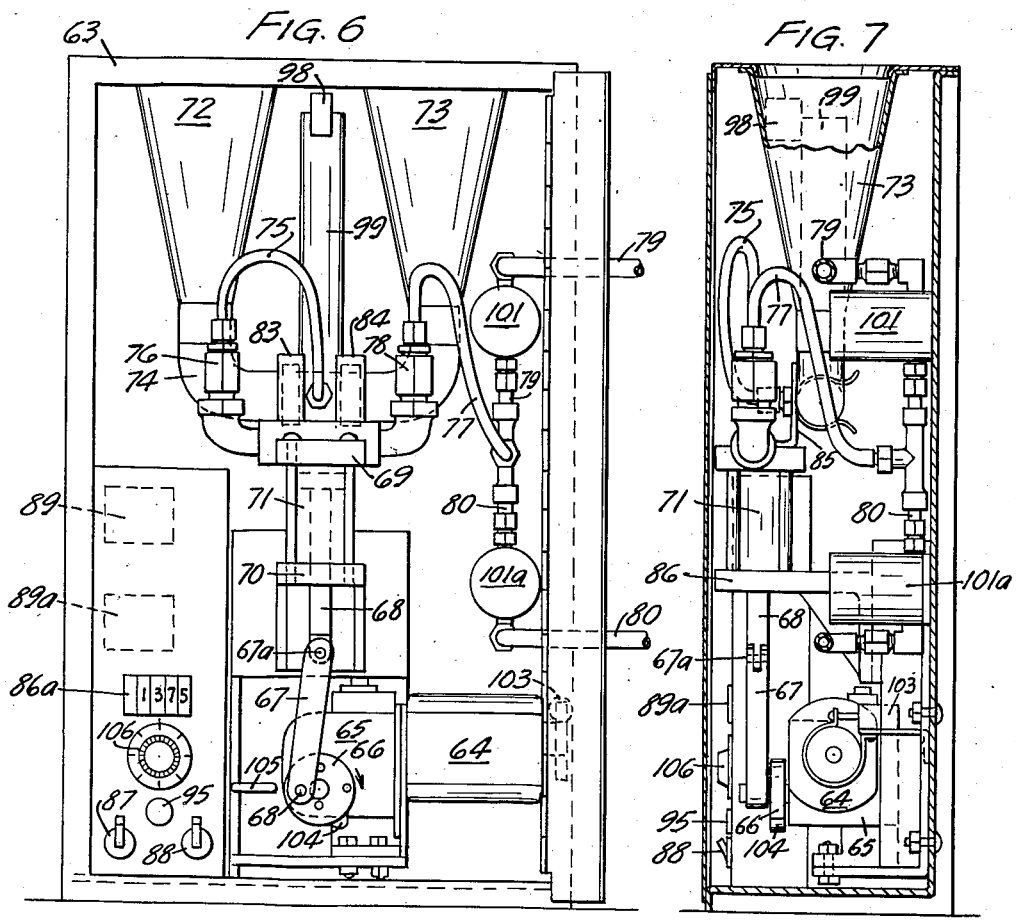
INVENTOR.
HAROLD R. MONTBRIAND
BY EARL L. MONTPETIT
Mark W. Gihan
ATTORNEY

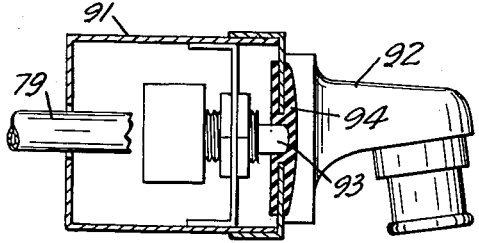
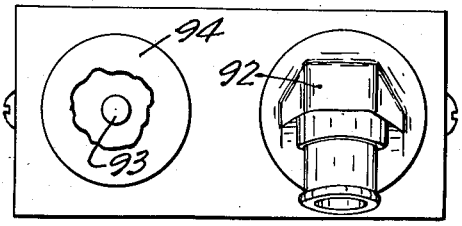
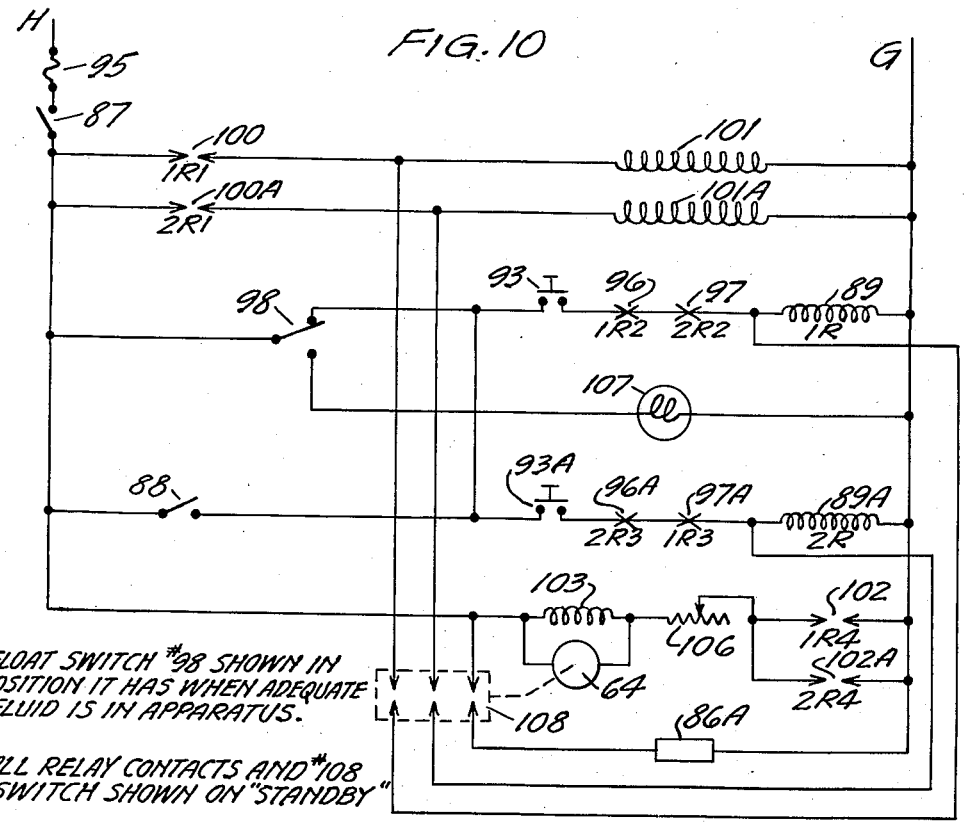
FLOAT SWITCH #98 SHOWN IN
POSITION IT HAS WHEN ADEQUATE
FLUID IS IN APPARATUS.
ALL RELAY CONTACTS AND #108
SWITCH SHOWN ON "STANDBY"
IR - #1 RELAY
IR1 - #1 RELAY-CONTACT-1
IR2 - #1 RELAY-CONTACT-2
IR3 - #1 RELAY-CONTACT 3
IR4 - #1 RELAY-CONTACT 4
2R - #2 RELAY
2R1 - #2 RELAY-CONTACT 1
2R2 - #2 RELAY-CONTACT 2
2R3 - #2 RELAY-CONTACT 3
2R4 - #2 RELAY-CONTACT 4
INVENTORS
HAROLD R. MONTBRIAND
EARL L. MONTPETIT
BY Mark W. Gehan
ATTORNEY United States Patent Office 2,831,609
Patented Apr. 22, 1958

2,831,609

LIQUID DISPENSING APPARATUS

Harold R. Montbriand and Earl L. Montpetit,
St. Paul, Minn.

Application January 9, 1957, Serial No. 634,396

4 Claims. (Cl. 222—76)

This invention relates to apparatus for automatically dispensing a measured amount of liquid from a larger quantity thereof. More particularly, the invention relates to apparatus for dispensing a predetermined, measured quantity of distilled spirits, or other beverage, into a glass. This application is a continuation-in-part of our application Serial No. 420,134, filed March 31, 1954, now abandoned.

It has, of course, traditionally been the practice for bartenders to measure the quantity of liquor intended for use in a beverage by pouring the liquor from a bottle containing the same into a measuring glass, and then into the glass from which the customer will drink. This practice is not only time-consuming, but results in considerable spillage and consequent waste of liquor. It also fails to provide any satisfactory means whereby the owner of the establishment can obtain an accurate check on the actual number of drinks which are being served to customers, and for which he should be receiving payment.

A number of expedients have heretofore been resorted to in an attempt to overcome the difficulties above referred to (as well as other difficulties involved in the traditional practice), but none of such expedients have been completely successful. For example, certain gravity flow apparatus heretofore used, although reducing the problem of spillage to some extent, has been so slow in operation that it has not been helpful in increasing the rate at which whiskey can be served, and this is a principal problem occurring in taverns, particularly during rush hours.

The apparatus of the present invention, on the other hand, provides a solution to each of the above mentioned problems, and others in addition thereto. It is capable of dispensing a predetermined amount of liquor (e. g., ⅝ oz., ¾ oz., 1 oz., or 1¼ ozs.) as fast as once per second. The amount to be dispensed can be very accurately set, prior to putting the machine in operation and the precise amount for which the machine is set will be very accurately dispensed each time the machine is used. It was not always true, under prior practice, that precisely the same amount of liquor would be served each customer, in view of the chance of error on the part of bartenders, etc. Despite its inclusion of pumping mechanism, the apparatus of the present invention takes only a small amount of space, and can be located any desired distance away from the liquor serving area, provided an outlet tube is conducted to the point where the liquor is to be dispensed. The apparatus is designed to accommodate any standard size or shape of liquor bottle, so that it can be used, without special adaptation, irrespective of the particular brands of whiskey being served. The machine is relatively inexpensive (particularly when its cost is related to the amount of labor which it saves), and is completely sanitary. It complies fully with law, and provides numerous safeguards for its use, as will be more particularly set forth hereinafter. A further feature of the present machine is the fact that it carries upon it a meter which indicates the number of drinks dispensed therefrom. This provides accurate means for tavern owners to keep check on the amount of liquor being served over the bar. The machine is very quickly and easily adjustable to serve varying amounts of liquor, as, for example, the amounts above mentioned. Other and further objects and advantages of the invention will appear as this description proceeds.

Referring now to the drawings,

Figure 5 is a rear elevational view of a bar at which our apparatus has been installed.

Figure 6 is a front elevational view of a modified embodiment of our apparatus.

Figure 7 is a side elevational view of the modified apparatus of Figure 6.

Figure 8 is a side view, partially in cross-section of a dispensing spigot and switch for actuating the apparatus.

Figure 9 is a front elevational view of the elements shown in Figure 8.

Figure 10 is a diagram of the wiring system employed in the apparatus of Figure 6.

Figure 1:
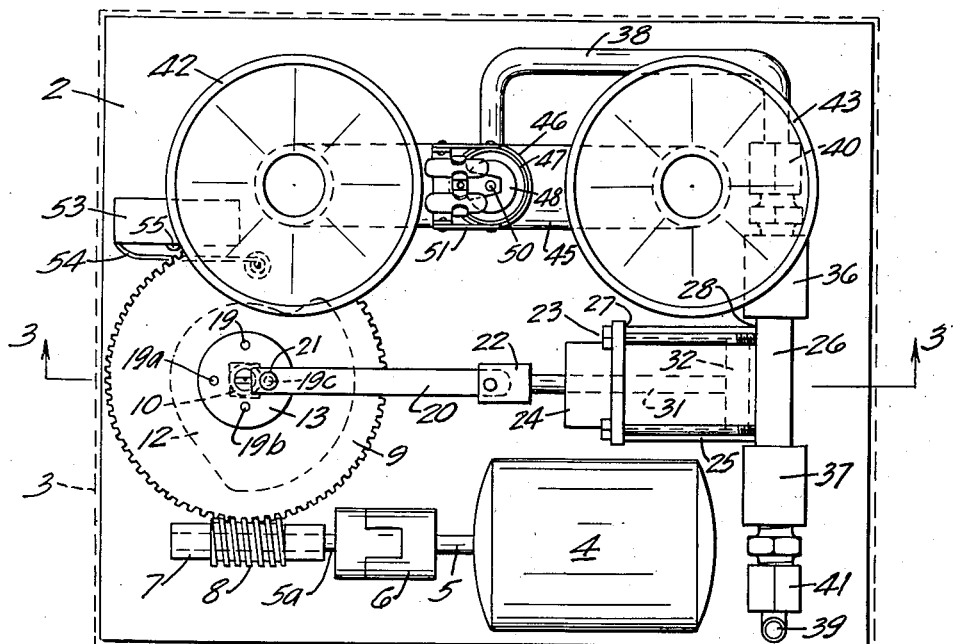
Figure 1 is a plan view of the apparatus.
Figure 2:
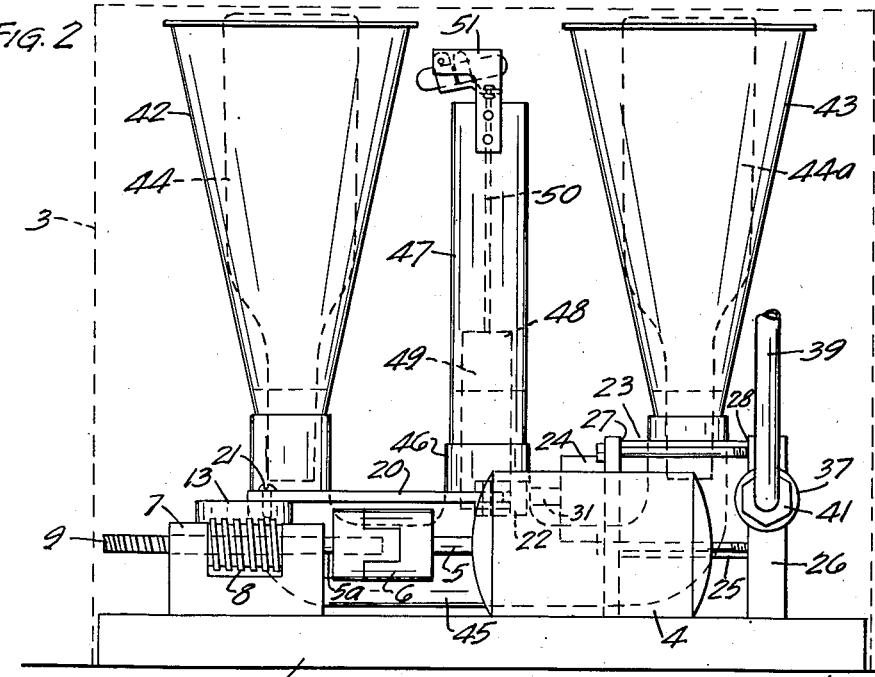
Figure 2 is a side elevational view of the apparatus.

Referring now to the drawings in more detail, and first to the embodiment shown in Figs. 1–4 of the drawings, reference character 2 represents a base upon which the apparatus is mounted. This base may be fabricated from any rigid material. The cover within which the assembly is enclosed is indicated by dotted lines 3, in Figures 1 and 2. Electric motor 4 is affixed to base 2 by any suitable means. Shafts 5 and 5a, mounted for rotation by motor 4 are coupled by element 6 which, in essence, comprises a universal joint provided with a rubber bushing. This element 6 is provided to eliminate any binding which might possibly otherwise occur when the machine is placed in operation. The tip of shaft 5a is provided with sleeve-like fitting 7, which fitting carries worm gear 8. Gear 8 is keyed to the notched periphery of wheel 9.

Figure 3:
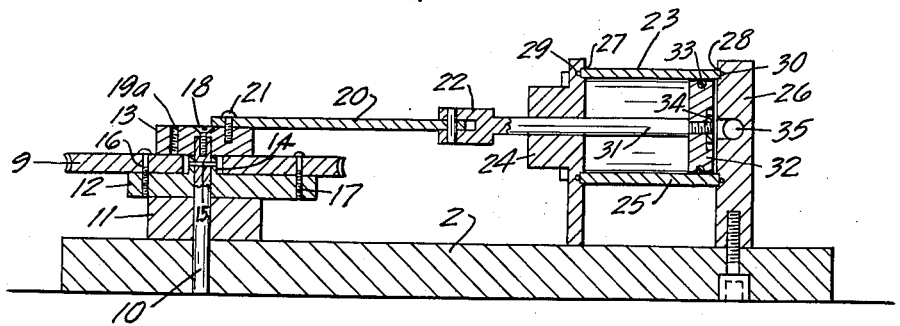
Figure 3 is a cross-sectional view, along line 3—3 of Figure 1.

Referring now particularly to Figure 3 of the drawings, base 2, as there shown, is furnished with upwardly projecting shaft 10, which is rotatable in relation to base 2. Shaft 10 passes through bearing 11, cam 12 and wheel 9. The upper tip of said shaft is fitted with element 13, the function of which will be hereinafter described. All of the length of shaft 10 except for the upper tip thereof, which lies within element 13, is circular in cross-section. The aforementioned upper tip of said shaft is rectangular in cross-section. Hub 14 is formed on the upper surface of cam 12, and pin 15 passes through said hub and through shaft 10, to maintain those members in fixed relation to each other. Wheel 9 lies over the top surface of cam 12, the central portion of said wheel being provided with an aperture which will fit snugly about hub 14 on cam 12. Wheel 9 is affixed to cam 12 by screws 16 and 17 passing through said wheel and into said cam. By reason of the foregoing arrangement, when the apparatus is put in operation, and gear 8 causes wheel 9 to rotate, shaft 10, cam 12 and element 13 will likewise rotate. Element 13 is maintained on the top of shaft 10 by set screw 18 threaded downwardly through the central portion of said element and into the tip of shaft 10. As above indicated, the upper tip of shaft 10 is rectangular in cross-section, and is received within a corresponding rectangular aperture in element 13. Thus, shaft 10 and element 13 are non-rotatable in respect to each other, and when shaft 10 is caused to turn, by rotation of wheel 9, element 13 will likewise turn. Although, in the embodiment of apparatus particularly shown, bearing 11 is shown as a separate element, it is equally feasible to cast said bearing member as a part of base 2, and that same procedure can be employed with certain other components to be hereinafter described.

As shown particularly in Figure 1 of the drawings, the top face of element 13 is provided with four apertures 19–19c. Each of these apertures is located a different distance away from the axis about which element 13 rotates. In the apparatus illustrated aperture 19 is located the farthest distance away, whereas aperture 19c, is located closest the axis of element 13. Arm 20 is attached to element 13 by set screw 21 passing through the apertured tip of said arm 20, into aperture 19c on element 13. When element 13 rotates, arm 20 will be retracted during 180° of the turn of element 13, and then will be advanced during the second 180° of turn of element 13, to its position, as shown. Arm 20 can be disengaged from aperture 19c and reset in any one of the other three apertures, namely, 19–19b, which, as above indicated, are of different distances away from the axis of rotation of element 13. If arm 20 is affixed to element 13 at aperture 19, for example, it will be retracted and advanced a greater distance as element 13 rotates, because of the fact that said aperture 19 lies farther away from the axis of rotation of element 13 than does aperture 19c thereon. The forward tip of arm 20 is mounted within swivel joint 22, so that lateral motion of arm 20 will be permitted as its rearward end is caused to move transversely by reason of its attachment to element 13.

Pump mechanism 23 comprises rear pump facing 24, pump cylinder 25 and forward pump facing 26. Said rear and forward pump facings are supported by base 2, and may, if desired, be cast integrally therewith. The opposed inward surfaces of each of facings 24 and 26 are provided with cylindrical grooves adapted to receive the opposed rims 27 and 28 of cylinder 25. These grooves may suitably be provided with O rings 29 and 30. Pump shaft 31 extends forwardly from swivel joint 22, through rear pump facing 24, and into cylinder 25. The forward tip of this shaft is provided with piston head 32 which fits snugly against the inner surface of cylinder 25, and is provided with O ring 33. Said head is maintained on shaft 31 by any suitable means, such as, for example, set screw 34 passing from the face of piston head 32 into shaft 31. Forward pump facing 26 is provided with bore 35 (see Figure 3) which is in communication with the interior of cylinder 25. Opposed ends of said bore 35 are provided with check valves 36 and 37 and lengths of copper tubing 38 and 39 are attached to these check valves by fittings 40 and 41. Each of said check valve is of the well known spring mounted ball bearing type, and the details thereof are not shown. Check valve 36 is constructed so that it will open as piston head 32 is retracted in cylinder 25, and valve 37 is constructed so that it will close during such movement of head 32. Said valves will operate in just the reverse fashion as piston head 32 advances in cylinder 25; i. e., valve 36 will close, and valve 37 will open.

Reference characters 42 and 43 indicate funnel-like elements adapted to receive and hold inverted bottles 44 and 44a of whiskey or other beverage. The bottom tips of these funnels (i. e., their narrow necks) are received within fitting 45. This fitting, which suitably can be made of copper, provides a chamber into which a portion of the beverage in bottles 44 and 44a may drain. The central portion of fitting 45 is provided with an upwardly extending tubular projection 46, which is formed integrally with fitting 45. Cylindrical tube member 47 is received within this projection. Float mechanism 48 is located within tube 47. This float mechanism comprises a thin, sealed glass chamber 49, to the top of which is attached wire rod 50. The top tip of said wire rod is in connection with dual mercury switch 51, the operation of which will be hereinafter described. As long as there is a quantity of liquid in bottles 44 and 44a, that liquid will flow downwardly into fitting 45 and upwardly, according to well known physical principles, in projection 46, and keep glass float 49 in "high" position within tube 47. However, if liquid in bottles 44 and 44a becomes depleted, the level of fluid in fitting 45, and float mechanism 48 will drop, permitting glass float 49 to descend to "low" position, whereupon wire rod 50 will tip dual mercury switch 51 thereby causing (a) a first circuit to motor 4 to be broken, and (b) a second circuit to light 52 to be closed, whereby said light will go on and indicate to the operator that fresh bottles of beverage should be inserted in the machine.

Reference character 53 represents a microswitch which will pass current when flexible prong 54 is depressed into contact with element 55 by the projected periphery of cam 12.

Figure 4:
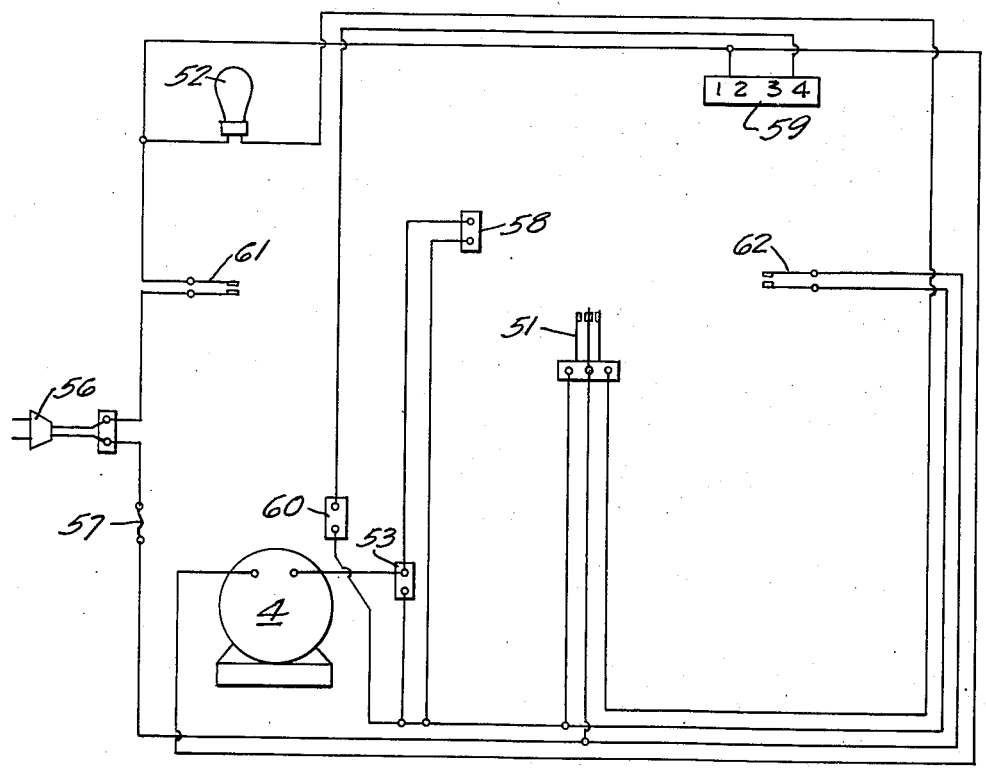
Figure 4 is a diagram of the wiring system employed in the apparatus.

Referring now to Figure 4 of the drawings, reference character 56 indicates a plug-in connector, adapted to be inserted in a 110 volt female plug. Reference character 57 represents a two ampere fuse included in the circuit for safety purposes. Operating switch 58 is placed in position where it can easily be closed by one wanting to use the apparatus for dispensing a quantity of whiskey, or such like. In commercial models of the apparatus, switch 58 is located directly below the spigot from which the beverage is dispensed, so that said switch will be closed by placing a glass below the spigot and pressing said glass against a switch control member. This switch 58 sets motor 4 in operation. Upon release of switch 58, the motor is kept in motion by reason of cam 12 actuating microswitch 53, which is wired parallel to switch 58. Switch 53 keeps the motor running until the proper amount of beverage has been dispensed. As has been heretofore indicated, motor 4, through the arrangement of parts above described, functions to operate pump 23. Said pump comprises the measuring device of the apparatus. Reference character 59 represents a meter whereby the number of drinks served from the machine will be tallied. The circuit to this meter is energized by cam 12 closing contacts in microswitch 60.

Manually operated master switch 61 is provided so that all circuits in the machine can be broken when desired. Switch 62 represents a "clean out" switch. This switch, when closed, provides a circuit which bypasses mercury control switch 51. Thus, when this switch 62 is closed, the machine will operate until all of the beverage in the bottles, fitting 45, pump 23 and tubing 39 is exhausted; i. e., until the machine "pumps dry." This provides means whereby all of the beverage in the machine can be exhausted therefrom to prevent mixing of beverages (contrary to law) when bottles containing new brands of beverage are desired to be inserted in funnels 42 and 43. Of course, in normal operation of the apparatus, when new bottles of the same kind of whiskey or such like are inserted into funnels 42 and 43, after the first bottles thereof have been used, clean out switch 62 will be left open, so that mercury control switch 51 will serve to automatically break the operating circuit in the machine (and energized light 52) prior to the time that the machine "pumps dry."

In operation of the machine, when switch 58 is closed, pump 23 will immediately act to expel the amount of liquid in cylinder 25 out thereof through bore 35 and thence through tube 39 to the point of dispensing into a glass. As above indicated, when piston head 32 moves forwardly in cylinder 25, check valve 36 will close and thus the beverage can move only through valve 37 and out through tubing 39. As soon as piston head 32 has functioned to expel the quantity of liquid from cylinder 25, it will then, on its return stroke, serve to draw an additional quantity of liquid from fitting 45, through tubing 38, check valve 36, bore 35 and into cylinder 25. The machine will then be ready for the next dispensing operation. It will be apparent that if arm 20 were to be reset into aperture 19, which is a greater distance away from the axis of element 13, pump 23 would draw a larger amount of beverage into cylinder 25, and would dispense said larger amount through tube 39. Said apertures 19–19c are adjusted so that an exact measurement, as desired, will be dispersed from the machine.

Referring now to the modified form of apparatus, shown in Figures 5–9 (the wiring circuit for said modified form being diagrammed in Figure 10), the apparatus there shown is broadly similar to the first embodiment hereinabove described, except for "layout" and except insofar as differences exist in the means for actuating the apparatus to perform its function.

In the modified form of apparatus, the working parts are enclosed in housing 63, within which the various elements of the device are mounted, in this instance, in more vertical arrangement. Motor 64 is affixed to the inner side surface of housing 63, in any suitable manner. Gearbox 65 is operably connected to said motor. Said gearbox serves to turn element 66 in a clockwise direction. Arm 67 is attached by screw member 68 on to the outward face of said element 66. Said arm is caused to move in a generally vertical direction, when element 66 is caused to rotate. The upper end portion of arm 67 is attached, by a swivel-type connection 67–A to the lowermost end of pump shaft 68, mounted between upper pump facing 69 and lower pump facing 70 in pump cylinder 71. The above mentioned elements comprise the pumping mechanism in the apparatus, and function very similarly to the pump mechanism 23 described in connection with the form of apparatus shown in Figures 1–4 of the drawings.

Funnel-like bottle holders 72 and 73 are adapted to drain into fitting 74. This fitting, like similar fitting 45, provides a reservoir for liquor, or other fluid, intended to be dispensed. Flow line 75 is in communication with fitting 74, and extends through check valve 76, into communication with the pump cylinder. Upon retraction of the pump mechanism (that is, when arm 67 descends) check valve 76 is caused to open, whereupon fluid contained in fitting 74 will be drawn through line 75, into said pump cylinder. As arm 67 commences its upward travel, thrusting the pump piston upwardly in the cylinder, check valve 76 will be caused to close. Flow line 77 extends from the pump cylinder (through check valve 78) to the flow lines 79 and 80 which carry the liquid to the point where it is to be dispensed. Such points are indicated by reference characters 81 and 82, in Figure 5, which are so-called "stations" mounted upon a bar, some distance away from the location of the dispensing apparatus proper. As the pump mechanism thrusts the liquid out of the pump cylinder, check valve 78 opens, and check valve 76 closes. There is thus no possibility of the liquid being forced back into fitting 74. Reference characters 83 and 84 designate brackets which serve to hold fitting 74 in position upon standard 85 which, in turn, along with the pump mechanism of the apparatus, is supported upon platform 86.

The apparatus as herein particularly described is, like the embodiment first referred to, provided with a counter 86a, whereby accurate record will be kept of the number of drinks dispensed. Reference character 87 designates an "on-off" switch; reference character 88 designates a second "on-off" switch. Two relays employed in the apparatus are indicated by reference characters 89 and 89a. The function of these members will be clear from the following description of the manner in which the apparatus operates.

Figure 8 shows particularly the construction of the dispensing station hereinabove referred to. This station, in normal usage, will be located away from the apparatus at some location convenient for the bartender. This device, as shown, comprises a box-like housing, 91, into which passes the outlet end of flow line 79 (and flow line 80, in the case of the other station identical to the one shown in Figure 8). The front of said box 91 is provided with spigot 92, from which the liquid being dispensed actually flows into the glass or such like held by the operator. Spigot switch 93 is mounted alongside spigot 92, and is manually operated. This spigot switch is covered with a strip of rubber, or other resilient material 94, to preclude it from becoming contaminated by moisture or other foreign substances. When spigot switch 93 is depressed, a measured portion of liquid is emitted from spigot 92, by reason of the electrical wiring circuit now to be described.

Referring to Figure 10, reference character H designates the "hot" side of the circuit to be energized. Reference character G designates the "ground" side of that circuit. When a plug-in connector (not shown, but within which wires H and G may conveniently be enclosed), is plugged into an electrical source, the circuit is energized, through fuse 95, provided "master switch" 87 is closed. When the circuit is thus energized, and spigot switch 93 (or the corresponding switch at the other "station" shown in Figure 5) is depressed, the electrical circuit to relay 89 is closed through No. 1 relay contact 96, No. 2 relay contact 97, and through float switch contact 98, which latter switch is closed when there is sufficient fluid in the bottles being dispensed from to fill fitting 74 and to rise within upwardly extending projection 99 with which said float switch 98 is associated. When relay 89 is thus temporarily actuated, it makes No. 1 relay contact 100, thereby energizing solenoid valve 101, which will allow fluid to flow, through line 79, to spigot 92. In addition to opening solenoid valve 101, the depression of spigot switch 93 will also result in relay 89 causing contact 102 to close, thereby energizing motor 64, and brake solenoid 103. This then results in the delivery of fluid to the station actuated.

Element 66 is provided, on its periphery, with protuberance 104. This protuberance, as said element 66 rotates, is brought into contact with the handle 105 for switch 108, thereby depressing said handle. Thus, when element 66 is caused to turn by motor 64, switch 108 will in fact be operated and will close a circuit to relay 89, thereby reactivating that said relay. When that happens (i. e., when relay 89 is reactivated) the relay contacts in said relay 89, are returned to the position that they occupied prior to the depression of spigot switch 93, as hereinabove referred to. This results in motor 64, and the brake solenoid 103 being de-energized, and solenoid 101 being closed so that fluid will not any longer be permitted to flow through flow line 79. By means of the circuitry just referred to, the apparatus acts as its own shut-off, independent of the operator. In other words, once the operator has depressed spigot switch 93, the machine will go through the operation of delivering one, and only one, measured portion of liquid, and then deenergize and shut off. Rheostat 106 is included in series with the wiring to motor 64, and serves as a speed control for the speed of the motor, to control the force with which the pump operates, etc.

The second station, shown in Figure 5, is constructed identically to the station hereinabove particularly referred to. When spigot switch 93–A, in that second station is depressed, the same sequence occurs as has been hereinabove described, except that relay 89–A in this instance is momentarily activated. Relay contacts 96–A and 97–A and float switch 98 serve to complete the circuit to relay 89–A. A different solenoid, namely No. 101–A, is in this instance opened to permit the flow of liquid, this time through flow line 80. Irrespective of whether relay 89 is energized, or whether, on the other hand, relay 89–A is energized, brake solenoid 103 and motor 64 are likewise energized, causing fluid to be dispensed from the spigot in circuit with whichever station is being operated.

The circuit above described is so designed that liquid may be dispensed from only one station at a time. However, if a person desiring to operate station 81, for example, will maintain the spigot button upon that station in depressed position, he will obtain the proper quantity of measured liquor, immediately upon cease of the other station 82 in its dispensing operation. The circuit, as shown in Figure 10, will preclude delivery of liquid at more than one station at one time.

Tubular projection 99 contains within it a float member which, when raised and/or lowered, will actuate float switch 98. When liquid which has risen in said projection 99 falls below a predetermined level, said switch 98 will break the flow of current to the station circuits, and also close a circuit to lamp 107 which is mounted externally of housing 63. This then informs the operator that fluid in the inverted bottles in the machine, and in the machine itself, is nearly exhausted, and that it should be replenished.

Reference character 108 indicates the detail of the switch operated by handle 105, said switch being actuated by the turning of element 66. This switch is a triple pole single throw switch, whose function, as above indicated, is to reactivate relay 89, or relay 89–A, whichever had been previously actuated by depression of spigot switches 93 or 93–A. Switch 108 essentially serves to put the machine back in "standby" condition, after either of stations 81 or 82 has been operated. The machine is thus immediately ready for re-use, at either station. When switch 108 is closed, one of the three poles therein closes or actuates a circuit to counter 86a, thereby keeping an accurate record of the number of drinks dispensed from the machine.

Drain switch 88 is included in the apparatus to permit the same to be completely drained of liquor, for cleaning, or for other reasons. This switch, in effect, shorts out float switch 98, which latter switch precludes further operation of the machine, or withdrawal of fluid therefrom, when the liquid in the apparatus has fallen below a predetermined level. There is, however, still some liquid in the machine when float switch 98 functions to preclude further operation thereof. Drain switch 88 closes the circuit which has been broken by switch 98, thus permitting withdrawal of the rather small remaining amount of liquid from the flow lines, etc.

Although the apparatus as herein specifically described has been designed for use with only two delivery stations, it should be understood that additional delivery stations could be utilized by including an additional relay, and contacts, and solenoid valves for the additional stations desired.

All relay contacts, as shown in Figure 10 of the drawings, are shown in their normal "standby" condition. Additionally, float switch 98 is shown in the position which it takes when there is adequate fluid in the apparatus, and triple pole single throw switch 108, is also shown in the "standby" condition. Spigot switches 93 and 93–A, in Figure 10, are shown in their undepressed or "open" position. The master switch 87 and the drain switch 88 are also shown in open position.

It will, of course, be understood that relays 89 and 89–A differ from many relays in that they do not make specific contacts when they are energized, and make other specific contacts when they are de-energized. These relays 89 and 89–A are "double throw" relays which, upon activation, take and retain a position until again activated, whereupon they return to their first position. The first throw in each relay is accomplished by energizing and de-energizing the relay. The second throw is accomplished by again energizing and de-energizing the relay. The mechanical means whereby this double throw action is accomplished is the movement of the relay armature tripping a spring loaded lever which mechanically positions the contacts. One action of the armature, in relay 89 (for example) breaks contacts 96 and 97–A and makes contacts 100 and 102. The second action of the armature again trips the spring loaded lever, reversing the action, making contacts 96 and 97–A and breaking contacts 100 and 102, thus putting those relay contacts back in their original or "standby" position. The action of relay 89–A is identical to the action of relay 89, except, of course, that contacts 97 and 96–A, 100–A and 102–A are involved. Utilization of this kind of relay results in a fully automatic cycle of operation; that is, once the operator has depressed a station button (93 or 93–A) the machine functions to dispense liquid and then returns to normal position without further action or attention from the operator.

While specific details have been herein disclosed and described, the invention is not confined thereto as changes and alterations will be made without departing from the spirit of the invention. We do not intend to be limited to any particular details set forth herein. The particular arrangements described are given by way of example, and not by way of limitation. Having fully described our invention, what we claim as new and desire to secure by Letters Patent is:

1. An apparatus for automatically dispensing a measured amount of liquid from a larger quantity thereof, comprising an electric motor, a pump, including a pump shaft, a gear arrangement connecting said motor to said pump shaft for operation of said pump when said motor is energized, a plurality of funnel-like elements adapted to support bottles in inverted position to permit liquid to drain therefrom, a fitting secured to the lower ends of said funnel-like elements, said fitting being formed hollow to receive a portion of liquid drained from said bottles, said fitting being formed with an upwardly extending tubular projection within which liquid in said fitting may rise, said tubular projection having a float mechanism within it, said float mechanism floating upon the surface of liquid within said projection and rising and descending with the same, said float mechanism being in electrical circuit with a switch to provide for automatic de-energization of said motor when liquid in said projection falls below a predetermined level, a first flow line from said fitting to said pump, a second flow line from said pump to a dispensing outlet, each of said flow lines having a check valve incorporated within it, said valves being operated by pressure from said pump and being arranged so that the said valve in the second flow line will open, and the said valve in the first flow line will close, upon a forward stroke of said pump, and vice versa, upon a backward stroke of said valve, said pump when stroking in a backward direction functioning to draw a quantity of liquid from said fitting through said first flow line and into said pump, said pump, when stroking in a forward position, functioning to expel liquid from said pump through said second flow line to said dispensing outlet, an electric switch positioned adjacent said outlet, said switch being operable to energize said motor, an eccentric cam associated with said gear means, a microswitch lying within the projected periphery of said cam, said microswitch being in parallel electrical circuit with said electric switch, said cam, upon energization of said motor by said electric switch then rotating to close said microswitch for the period of time that the projected periphery of said rotating cam takes to pass over said microswitch, said microswitch when closed permitting the flow of current to said motor to keep the same operating for one dispensing operation, said gear means including a toothed-wheel, said pump shaft being affixed to said toothed-wheel, the length of stroke of said pump shaft being controlled by reconnecting said pump shaft to said toothed-wheel closer or farther away from the axis of rotation of said toothed-wheel, the length of stroke of said pump shaft determining the amount of liquid dispensed.

2. An apparatus for automatically dispensing a measured amount of liquid from a larger quantity thereof, comprising an electric motor, a pump, including a pump chamber, a gear arrangement connecting said motor to said pump for operation of the latter when said motor is energized, a liquid source, a hollow fitting secured to said liquid source, a first flow line from said fitting to said pump, said first flow line having a check valve incorporated within it, a second flow line from said pump to a dispensing outlet, said second flow line likewise having a check valve incorporated within it, said pump, when stroking in one direction, functioning to draw a quantity of liquid from said fitting through said first flow line into said pump chamber, the check valve in said second flow line then being closed by action of said pump, said pump, when stroking in the opposite direction, functioning to expel said liquid from said pump chamber through said second flow line to said dispensing outlet, the check valve in said first flow line then being closed by action of said pump, said gear arrangement including a toothed wheel rotatable by said motor, a shaft affixed to the central portion of said toothed wheel and extending to said pump, rotation of said toothed wheel causing said pump to operate, said shaft being affixable closer or farther away from the axis of rotation of said wheel for longer or shorter strokes of said pump, the amount of liquid dispensed by said apparatus thereby being controllable, said fitting being formed with an upwardly extending tubular projection within which liquid from said liquid source may rise, said tubular projection having a float mechanism within it, said float mechanism floating upon the surface of liquid within said projection and rising and descending with the same, said float mechanism being in electrical circuit with a switch to provide for automatic de-energization of said motor when liquid in said projection falls below a predetermined level, a cam element associated with said pump, said cam element rotating with said toothed wheel to operate an electrical switch whereby said motor will be kept energized through one dispensing operation.

3. An apparatus for automatically dispensing a measured amount of liquid from a larger quantity thereof, comprising an electric motor and a shaft extending therefrom, said shaft being formed with a worm gear at its tip and being rotated by said motor, a toothed wheel keyed to said worm gear, a pump shaft affixed to the top surface of said toothed wheel, a pump in connection with said pump shaft, said toothed wheel being caused to rotate by said worm gear, said pump shaft being caused to move by said toothed wheel, a plurality of funnel-like elements adapted to support bottles in inverted position to permit liquid to drain therefrom, a fitting secured to the lower ends of said funnel-like elements, said fitting being formed hollow to receive a portion of liquid drained from said bottles, said fitting being formed with an upwardly extending tubular projection within which liquid in said fitting may rise, said tubular projection having a float mechanism within it for automatically breaking an electrical circuit to said motor when liquid within said fitting falls below a predetermined level, a first flow line from said fitting to said pump, a second flow line from said pump to a dispensing outlet, said pump, when stroking in one direction, functioning to draw a quantity of liquid from said fitting through said first flow line and into said pump, said pump, when stroking in the opposite direction, functioning to expel said liquid from said pump through said second flow line to said dispensing outlet, said pump shaft being affixable at different particular points upon said toothed wheel to vary the length of the stroke of said pump shaft, a cam element associated with said pump and operating to depress an electrical switch to energize said motor for one complete dispensing operation.

4. An apparatus for automatically dispensing a measured amount of liquid from a larger quantity thereof, comprising an electric motor, a pump, including a pump shaft, a gear arrangement connecting said motor to said pump shaft for operation of said pump when said motor is energized, a plurality of funnel-like elements adapted to support bottles in inverted position to permit liquid to drain therefrom, a fitting secured to the lower ends of said funnel-like elements, said fitting being formed hollow to receive a portion of liquid drained from said bottles, said fitting being formed with an upwardly extending tubular projection within which liquid in said fitting may rise, said tubular projection having a float switch associated with it, said float switch being in an electrical circuit to provide for automatic de-energization of said motor when liquid in said projection falls below a predetermined level, a first flow line from said fitting to said pump, a second flow line from pump to a dispensing outlet, each of said flow lines having a check valve incorporated within it, said valves being operated by pressure from said pump and being arranged so that the said valve in the second flow line will open, and the said valve in the first flow line will close, upon a forward stroke of said pump, and vice versa, upon a backward stroke of said valve, said pump when stroking in a backward direction functioning to draw a quantity of liquid from said fitting through said first flow line and into said pump, said pump, when stroking in a forward position, functioning to expel liquid from said pump through said second flow line to said dispensing outlet, an electric outlet-switch, said outlet-switch being operable to energize said motor, a cam associated with said gear means, said cam being formed with a protuberance upon its periphery, a relay-switch lying within the path of said protuberance, said relay-switch being in electrical circuit with a relay, said protuberance, upon energization of said motor by said outlet-switch then moving to close said relay-switch and reactivate said relay thereby cutting off the flow of fluid from said dispensing outlet, said relay-switch when not reactivated permitting the flow of current to said motor to keep the same operating, said pump shaft being affixed to said cam, the length of stroke of said pump shaft being controlled by reconnecting said pump shaft to said cam closer or farther away from the axis of rotation of said cam, the length of stroke of said pump shaft determining the amount of liquid dispensed.

References Cited in the file of this patent

UNITED STATES PATENTS

| | | |
|---|---|---|
| 2,631,755 | Woodward | Mar. 17, 1953 |
| 2,672,272 | Harris et al. | Mar. 16, 1954 |